Dec. 4, 1951   C. C. CARLSON   2,577,228
DRILL POINT GAUGE
Filed Feb. 17, 1950   2 SHEETS—SHEET 1
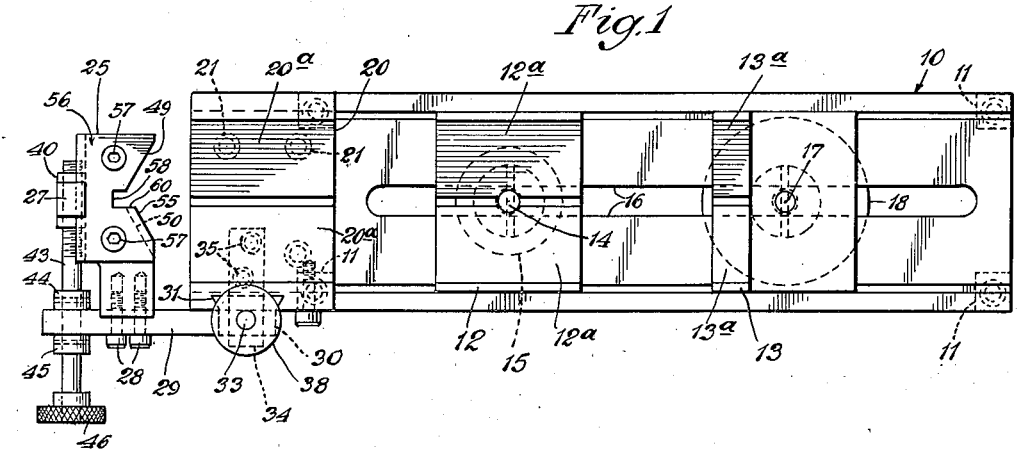
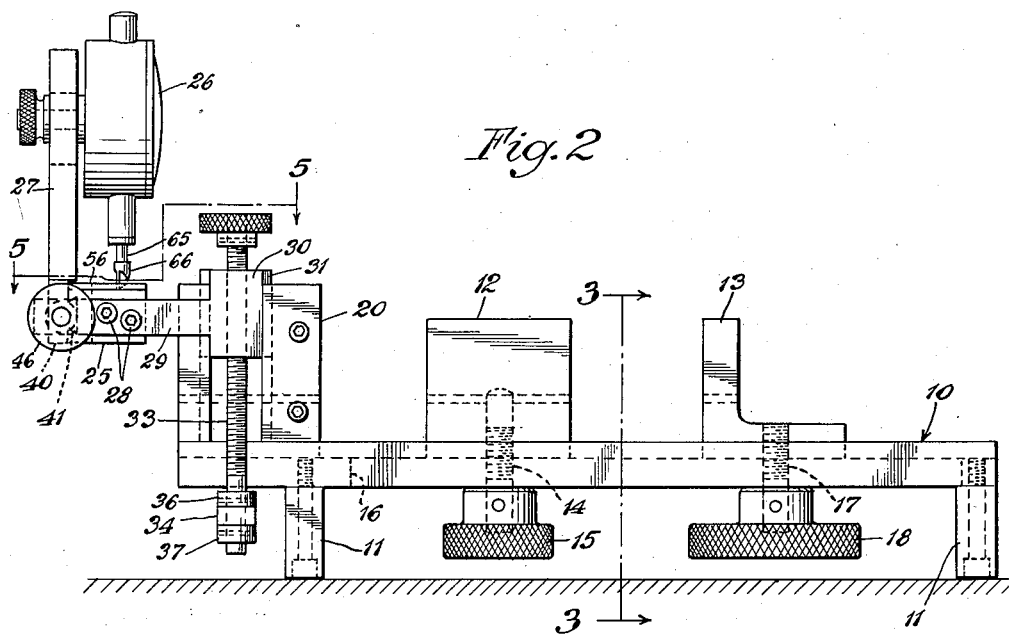
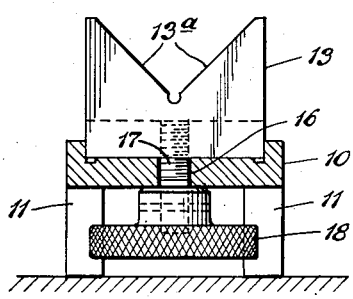
Inventor
Clarence C. Carlson
by Parker + Carter
Attorneys Dec. 4, 1951     C. C. CARLSON     2,577,228
DRILL POINT GAUGE
Filed Feb. 17, 1950     2 SHEETS—SHEET 2
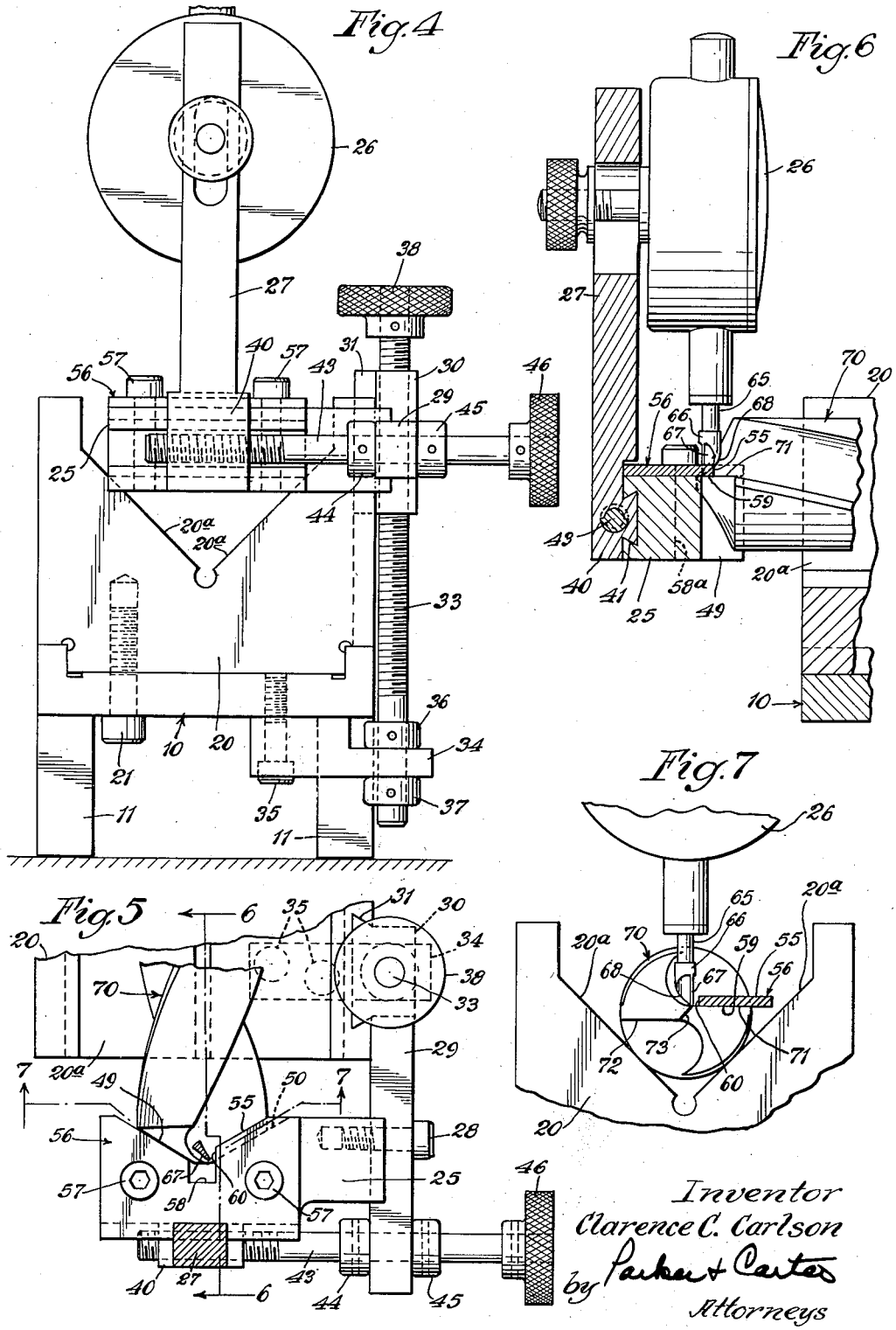
Inventor
Clarence C. Carlson
by Parker + Carter
Attorneys Patented Dec. 4, 1951

2,577,228

UNITED STATES PATENT OFFICE 2,577,228

DRILL POINT GAUGE

Clarence C. Carlson, Batavia, Ill., assignor to Burgess-Norton Mfg. Co., Geneva, Ill., a corporation of Illinois Application February 17, 1950, Serial No. 144,686

8 Claims. (Cl. 33—201)

This invention relates to improvements in drill point gauges of the kind designed to determine whether or not the web of a twist drill has been ground on center.

Twist drills, as they come from the factory, are usually formed at the cutting end with a cone-shaped surface called the "point" and with two spiral grooves running along opposite sides of the drill known as "flutes." The metal column which separates the flutes is known as the "web." This web is the main supporting column of the drill and gradually increases in thickness toward the shank of the drill opposite the point. The two flutes terminate at the point in cutting edges or lips which are substantially parallel with each other and separated at the extreme tip end of the drill by a sharp edge called the "dead center" or "chisel point." This chisel point is usually formed at an angle which is slightly oblique to each of said cutting lips.

In preparing a drill for operation either when it comes from the factory or when its point is re-sharpened by grinding, the generally conical surfaces of the point are ground at a certain angle to the axis, and a certain clearance with respect to each cutting lip, to give the desired cutting action. Commercial twist drill point grinders are available for pointing drills with the proper angles and clearances. In addition, however, it is also necessary to thin the web each time a drill is pointed back or sharpened to obtain the desired ease of penetration and wear. This thinning operation is usually done by hand on a relatively thin, round face emery wheel, which is applied alternately along the inner spiral surfaces of the two flutes, so as to thin down the web toward the chisel point and the cutting lips.

Different types of gauges have heretofore been employed for determining whether the point surfaces have been ground at the proper angle, and with the dead center or chisel point on the dead center axis of the drill, but heretofore the drill pointer has had to rely mainly upon his eyesight to determine whether or not the web thinning operation, which he has accomplished by hand, has left the web of equal radial thickness at both sides of the dead center axis.

The object of the present invention is to provide a gauge for determining whether or not the web has been ground on center, or how much "off" it might be.

A further object of the invention is to provide a drill gauge of the character described, wherein the supporting parts of the gauge are relatively open so as to permit the operator to observe whether or not the drill point is in proper registering relation with the critical parts of the gauge during testing.

Another object is to provide a gauge structure of the kind above described, which is readily adjustable for drills of different sizes.

Other objects and advantages of the invention will appear from time to time as the following description proceeds.

The invention may best be understood by reference to the accompanying drawings, in which:

Figure 1 is a plan view of a drill gauge constructed in accordance with my invention but with the off-center indicator omitted therefrom;

Figure 2 is a side view of the gauge shown in Figure 1 but with the off-center indicator mounted thereon;

Figure 3 is a detailed section taken on line 3—3 of Figure 2;

Figure 4 is an enlarged end view of the gauge shown in Figure 2;

Figure 5 is a fragmentary detailed section taken generally on line 5—5 of Figure 2 showing a drill in position for checking in the gauge;

Figure 6 is a detailed section taken generally on line 6—6 of Figure 5; and

Figure 7 is a detailed section taken on line 7—7 of Figure 5.

Referring now to the details of the embodiment of my invention shown in the drawings, the gauge includes horizontal bed plate or frame 10 which may be provided with supporting legs 11, 11. Two V-shaped supporting blocks 12 and 13 are adjustably mounted longitudinally of the bed frame 10 to receive and support drills of varying lengths in horizontal alignment with said bed frame. In the form shown herein, one of the V-shaped blocks 12 has V-shaped drill supporting surfaces 12a somewhat longer than the drill supporting surfaces 13a of the block 13. The block 12 is secured in place on the bed frame 10 by a threaded stem 14 extending downwardly through an elongated slot 16 formed centrally and lengthwise of the bed frame 10, and having a knurled hand-nut 15 engaging the under face of said bed frame. The block 13 has a threaded stem 17 also passing through the slot 16 and with a nut 18 thereon. In the form shown, the knurled adjusting nut 18 of block 13 is somewhat larger than the adjusting nut 15 of block 12 since the latter block usually may remain in substantially the same position for most sizes of drills, whereas the block 13 may require more frequent adjustment to accommodate drills of different lengths.

A third V-shaped supporting block 20 is fixed at one end of the bed frame, having V-shaped supporting surfaces 20a, 20a in horizontal alignment with the corresponding V-shaped surfaces 12a and 13a of the movable blocks 12 and 13 respectively. The block 20 may be fixed to the bed frame 10 by suitable means, such as cap screws 21. The fixed block 20 and one or more of the movable blocks 12 and 13 are thus adapted to support drills of varying diameters and lengths for axial rotation for testing, as will presently be described.

The gauging means is mounted on the end of the bed frame 10 in longitudinally spaced relation to the fixed supporting block 20 and consists essentially of an end block 25 against which the point of the drill may have seating engagement, and a calibrated gauge member or indicator 26 fixed on an upright standard 27 secured to the end block 25.

The end block 25 is mounted for vertical adjustment relative to the bed frame to accommodate the gauge means to drills of various sizes. The end block 25 is suitably connected as by cap screws 28 to a horizontally disposed supporting arm 29 connected to, and herein formed integrally with, a block 30 having dove-tailed connection indicated at 31 for vertical sliding adjustment along one side of the fixed supporting block 20. The vertical adjustment of the block 30, carrying arm 29 and end block 25, is effected by an upright screw shaft 33 threaded through the block 30 and having its lower end journalled in a laterally extending bracket 34 fixed as by cap screws 35 to the bottom face of the bed frame 10 (see Figure 4). Thrust collars 36 and 37 are pinned on the screw shaft 33 above and below the bracket 34. A knurled thumb nut 38 is fixed to the upper end of the shaft 33 for manual rotation of the screw shaft 33.

The upright standard 27, carrying the gauge indicator 26, is horizontally adjustable transversely of the end block 25 as by a block 40, herein formed integrally with the lower end of the standard 27 and having dove-tailed connection indicated at 41 for horizontal sliding movement along the rear or outer face of the end block. Adjustment of block 40 is controlled by a shaft 43 having one end threaded in the block 40 and the other end journalled in the outer end of arm 29 with thrust collars 44 and 45 engaging opposite sides of the latter arm. A knurled thumb nut 46 is fixed on the extreme outer end of shaft 43 for manual rotation of the latter.

Referring now more specifically to details of the end block 25 and its relation to the gauge member 26, said end block is provided with two inwardly facing, generally upright bearing faces 49 and 50 which are disposed at an angle to each other corresponding to the conventional angle to which the conical end surfaces of commercial drills are usually ground; namely, at angles of 59° to the axis of the drill, or at 118° to each other.

The bearing faces 49 and 50 on end block 25 are disposed in longitudinally centered alignment with the drill supporting blocks 20, 12 and 13, so as to receive the point of a drill in seated relation therebetween when a drill is laid in horizontally centered position along the supporting blocks 20, 12 and 13, and the end block is raised or lowered into registering position with the drill point.

A horizontally disposed stop member 55 projects inwardly from one of the bearing faces of the end block 25. As shown herein, said stop member may be integral with a plate 56 secured as by cap screws 57, 57 to the upper surface of the end block 25. Said plate 56 has its inner edge cut to shape corresponding with the contour of the bearing faces 49 and 50 of the end block, excepting for the projecting stop member 55, the lower face of which forms a stop shoulder 59. The inner end 60 of stop member 55 terminates at a recess 58 formed in the plate 56 in vertical alignment with an upright groove 58a formed in the end block 25 at the point of juncture of the bearing faces 49 and 50. Thus, the inner terminal edge 60 of the stop member 55 terminates short of the longitudinal center line or axis of the gauge, for reasons that will presently appear.

The gauge member or indicator 26 may be a conventional dial type indicator having a movable control rod 65 depending therefrom with a tip 66. The gauge member 26 and its tip 66 are mounted on the upright standard 27 so that the tip 66 projects downwardly within the recessed portion 58 of plate 56, for comparing the relative depths of the web surfaces of the drill at the extreme end of the drill flutes. The indicator on the gauge dial is preferably set at zero when the extreme point of the gauge tip is in exact alignment with the stop shoulder 59. The gauge tip is, however, free for limited longitudinal movement above and below its zero point, as usual in indicating devices of this kind.

The use and operation of the gauge may now be described as follows:

As will be seen from Figures 5 and 6, a drill indicated at 70 is laid on and along the supporting blocks 20, 12 and 13 and its conical point is moved endwise into seated engagement with respect to the upright bearing faces 49 and 50 of the end block 25. It may be necessary, as previously mentioned, to adjust the end block 25 to the proper height for this purpose. During such vertical adjustment, stop member 55 must be positioned so that the stop shoulder 59 is brought into substantial, if not precise, parallelism with the face, as shown in Figures 6 and 7. This adjustment is readily effected first by providing a rough vertical adjustment of the end block relative to the drill point, and then by rotating the drill point toward the stop shoulder 59 until the cutting lip 71 is substantially parallel with said stop shoulder. A final vertical adjustment of the end block is then made by thumb nut 38 to bring the cutting lip 71 into parallel engagement along and beneath the stop shoulder 59, as shown in Figures 6 and 7.

While the drill and end block are being brought into critical relative position, as shown in Figures 6 and 7 just described, it will be understood that the tip 66 of the indicator gauge is free for vertical movement closely adjacent the apex of the angle formed between bearing faces 49 and 50 of the end block so that said gauge tip may ride upon the upper surface of the cutting lip 71 within the inner terminal edge of the stop member 55 during such adjustment. The extreme point of the gauge tip is preferably adjusted so that the indicator on the gauge dial is zero when the point of the tip 66 is in exact alignment with the stop shoulder 59 on stop member 55. It will, therefore, be understood that, when the uppermost cutting lip 71 is adjusted into parallel engagement along and beneath the stop shoulder 59, the gauge reading should be zero, assuming of course that the cutting lip continues substantially straight to the point where the tip 66 engages said cutting lip closely adjacent the apex of the drill point.

As will be noted from Figure 7, however, the cutting lip 71 normally tends to curve upwardly and away from the true axis of the drill at a point slightly offset from said axis, that is to say from a point substantially above the upper end of the chisel point 73 of the drill, which is disposed at a slight angle to the cutting lip 71 and intersects the true axis of the drill. For best results, therefore, the extreme point of the gauge tip 66 is adjusted so that it rests on the edge of the cutting lip directly above the upper end of the chisel point at a point slightly offset from the drill axis in a direction toward the cutting lip 71, as clearly shown in Figures 5 and 7. With this position of the gauge tip 66, any variation, plus or minus, from true parallelism between the cutting lip 71 and the stop shoulder 59 will be registered on the dial of the indicator 26. For convenience, the indicator may be calibrated, as usual, in thousandths of an inch.

Once a plus or minus reading on the dial is ascertained for the cutting lip 71, the drill is then rotated by hand in its supports so as to bring the opposite cutting lip 72 into engagement beneath the stop shoulder 59. Then, without any vertical readjustment of the stop shoulder 59, a plus or minus reading of the gauge will immediately show by comparison whether or not the two cutting lips are properly centered with respect to the drill axis. In other words, the comparative reading of the gauge in the two positions of engagement of the cutting lips with respect to the stop shoulder 59 will quickly indicate whether or not the web has been equally thinned along the bottom of the two flutes where they terminate at their respective cutting lips, or whether further thinning of the web is necessary in one or the other of the flutes, to bring the two cutting lips into proper centered relation to the axis of the drill.

It may be explained further that, although reasonable care should be exercised in the initial setting of the end block so that the stop shoulder 59 is parallel with the first cutting lip when brought into engagement therewith, yet some variation from exact parallelism at this point may be permitted without seriously affecting the comparative readings for the two sides of the web. For instance, if only the outer end of the cutting lip 71 is brought into actual engagement with the stop shoulder 59 leaving a small angle between the inner end of this lip and the stop shoulder 59, a fairly accurate comparative reading can be obtained when the second lip 72 is rotated into engagement with the stop shoulder 59, because substantially the same amount of error will be included in the readings for both positions of the drill.

The gauge tip 66 is preferably formed with a terminal arcuate blade-like end 67 so as to aid said gauge tip in riding along the proximate surfaces of the drill while the latter is being advanced and rotated to position the cutting lips in their proper seated relation where the comparative readings are to be taken. In the preferred form shown herein, the blade-like end 67 is slightly wedge-shaped in cross section, shown in Figure 5, and said blade is turned at an angle to the axis of the drill which is slightly less than that of the proximate drill point surface. Thus, in Figure 5, the blade is turned at an angle of approximately 40° to the drill axis. The thinner edge of the blade-like end 67 is continued to the extreme point of the tip for engagement with the cutting lips of the drill while the wider edge of said blade is curved upwardly and rearwardly, as indicated at 68, to form a bearing engagement for proximate surfaces of the drill point, while the latter is being adjusted to reading positions in the gauge.

It will be further observed that, by reason of the extended position of the end block 25 and supporting arm 29 with respect to the fixed supporting block 20, there is ample space for the operator to observe whether the drill point is properly seated in the end block for the comparative gauge readings.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In a centering gauge for the web at the point of a twist drill, a fixture including drill supporting means affording rotation of a drill on its longitudinal axis, an end block spaced longitudinally of said supporting means having angularly disposed abutment faces adapted to receive the pointed end surfaces of the drill in endwise seated relation therebetween, a stop member projecting from one of said abutment faces normally thereto and outwardly of the line of intersection formed by extending the planes of said abutment faces, and gauge means mounted on said end block having a gauge tip movable along and closely adjacent said line of intersection, for successive engagement with each cutting lip substantially at the chisel point of the drill when each such cutting lip is engaged flatwise with said stop member.

2. In a centering gauge for the web at the point of a twist drill, a fixture including drill supporting means affording rotation of a drill on its longitudinal axis, an end block spaced longitudinally of said supporting means having angularly disposed abutment faces adapted to receive the pointed end surfaces of the drill in endwise seated relation therebetween, a stop member projecting from one of said abutment faces normally thereto and outwardly of the line of intersection formed by extending the planes of said abutment faces, means for adjusting said end block in a direction parallel to said line of intersection, and gauge means mounted on said end block having a gauge tip movable along and closely adjacent said line of intersection, for successive engagement with each cutting lip substantially at the chisel point of the drill when each such cutting lip is engaged flatwise with said stop member.

3. In a centering gauge for the web at the point of a twist drill, a fixture including drill supporting means affording rotation of a drill on its longitudinal axis, an end block spaced longitudinally of said supporting means having angularly disposed abutment faces adapted to receive the pointed end surfaces of the drill in endwise seated relation therebetween, a stop member projecting from one of said abutment faces normally thereto and outwardly of the line of intersection formed by extending the planes of said abutment faces, means for adjusting said end block in a direction parallel to said line of intersection, gauge means mounted on said end block having a gauge tip movable along and closely adjacent said line of intersection, for successive engagement with each cutting lip substantially at the chisel point of the drill when each such cutting lip is engaged flatwise with said stop member, and means for adjusting said gauge tip to varying reading positions toward or away from said stop member transversely of the end block.

4. In a centering gauge for the web at the point of a twist drill, a fixture including drill supporting means affording rotation of a drill on its longitudinal axis, an end block mounted adjacent said supporting means having angularly disposed abutment faces adapted to receive the pointed end surfaces of the drill in endwise seated relation therebetween, a stop member projecting from one of said abutment faces normally thereto and outwardly of the line of intersection formed by extending the planes of said abutment faces, and gauge means mounted on said end block having a gauge tip movable in a path along and closely adjacent said line of intersection, for successive engagement with each cutting lip substantially at the chisel point of the drill when each such cutting lip is engaged flatwise with said stop member, said gauge tip comprising an arcuate blade member terminating in a lip-contacting point, and said blade being turned at an acute angle to the axis of said drill point with its lip-contacting point extending toward the stop member.

5. In a centering gauge for the web at the point of a twist drill, a fixture including drill supporting means affording rotation of a drill on its longitudinal axis, an end block mounted adjacent said supporting means having angularly disposed abutment faces adapted to receive the pointed end surfaces of the drill in endwise seated relation therebetween, a stop member projecting from one of said abutment faces normally thereto, and gauge means mounted on said end block having a gauge tip movable in a path along and closely adjacent the line of intersection of the extended planes of said abutment faces, for successive engagement with each cutting lip substantially at the chisel point of the drill when each such cutting lip is engaged flatwise with said stop member, said gauge tip comprising an arcuate blade member tapered toward its end and terminating in a lip-contacting point, and said blade being turned at an acute angle to the axis of said drill point with its lip-contacting point extending toward said stop member.

6. In a centering gauge for the web at the point of a twist drill, a fixture including drill supporting means affording rotation of a drill on its longitudinal axis, an end block spaced longitudinally of said supporting means having angularly disposed abutment faces adapted to receive the pointed end surfaces of the drill in endwise seated relation therebetween, a stop member projecting from one of said abutment faces outwardly of the line of intersection formed by extending the planes of said abutment faces, having an elongated stop shoulder disposed in a plane perpendicular to the line of intersection, and gauge means mounted on said end block having a gauge tip movable along and closely adjacent said line of intersection, for successive engagement with each cutting lip substantially at the chisel point of the drill when each such cutting lip is engaged flatwise with said stop member.

7. In a centering gauge for the web at the point of a twist drill, a fixture including drill supporting means affording rotation of a drill on its longitudinal axis, an end block spaced longitudinally of said supporting means having angularly disposed abutment faces adapted to receive the pointed end surfaces of the drill in endwise seated relation therebetween, a stop member projecting from one of said abutment faces outwardly of the line of intersection formed by extending the planes of said abutment faces, having an elongated stop shoulder disposed in a plane perpendicular to the line of intersection, means for adjusting said end block in a direction parallel with said line of intersection, and gauge means mounted on said end block having a gauge tip movable in a path closely adjacent said line of intersection, for successive engagement with each cutting lip substantially at the chisel point of the drill when each such cutting lip is engaged flatwise with said stop member.

8. In a centering gauge for the web at the point of a twist drill, a fixture including drill supporting means affording rotation of a drill on its longitudinal axis, an end block spaced longitudinally of said supporting means having angularly disposed abutment faces adapted to receive the pointed end surfaces of the drill in endwise seated relation therebetween, a stop member projecting from one of said abutment faces outwardly of the line of intersection formed by extending the planes of said abutment faces, having an elongated stop shoulder disposed in a plane perpendicular to the line of intersection, means for adjusting said end block in a direction parallel with said line of intersection, gauge means mounted on said end block having a gauge tip movable in a path closely adjacent said line of intersection, for successive engagement with each cutting lip substantially at the chisel point of the drill when each such cutting lip is engaged flatwise with said stop member, and means for adjusting said gauge tip to varying reading positions toward and away from said stop member transversely of the end block.

CLARENCE C. CARLSON.

REFERENCES CITED

The following references are of record in the file of this patent:

UNITED STATES PATENTS

| Number | Name | Date |
|---|---|---|
| 996,503 | Minges | June 27, 1911 |
| 1,174,009 | Hjorth | Feb. 29, 1916 |
| 2,337,819 | Hofmann | Dec. 28, 1943 |

FOREIGN PATENTS

| Number | Country | Date |
|---|---|---|
| 219,184 | Switzerland | May 1, 1942 |

OTHER REFERENCES

American Machinists, May 22, 1930, pages 838, 839.